United States Patent [19]
Miller et al.

[11] Patent Number: 6,097,140
[45] Date of Patent: Aug. 1, 2000

[54] DISPLAY PANELS USING FIBROUS FIELD EMITTERS

[75] Inventors: Arthur Miller, Princeton Junction, N.J.; Dennis John Bechis, Yardley, Pa.; Steven Alan Lipp, Cranbury; Jeffrey Paul Johnson, Lawrenceville, both of N.J.; Daniel Irwin Amey, Jr., Hockessin, Del.

[73] Assignee: E. I. du Pont de Nemours and Company, Wilmington, Del.

[21] Appl. No.: 09/029,314

[22] PCT Filed: Aug. 6, 1996

[86] PCT No.: PCT/US96/12822

§ 371 Date: Feb. 12, 1998

§ 102(e) Date: Feb. 12, 1998

[87] PCT Pub. No.: WO97/07524

PCT Pub. Date: Feb. 27, 1997

Related U.S. Application Data

[60] Provisional application No. 60/002,278, Aug. 14, 1995.

[51] Int. Cl.$^7$ ........................................... H01J 1/05
[52] U.S. Cl. .................. 313/311; 313/309; 313/336; 313/351; 313/495; 313/496; 313/497; 313/238; 313/244; 313/283
[58] Field of Search .................... 313/309, 310, 313/336, 346 R, 351, 495, 496, 497, 238, 243, 244, 248–49, 250–51, 282–88

[56] References Cited

U.S. PATENT DOCUMENTS

| | | | |
|---|---|---|---|
| 3,866,077 | 2/1975 | Baker et al. | 313/336 |
| 4,857,799 | 8/1989 | Spindt et al. | 313/495 |
| 5,015,912 | 5/1991 | Spindt et al. | 313/495 |
| 5,578,901 | 11/1996 | Blanchet-Fincher et al. | 313/309 X |

FOREIGN PATENT DOCUMENTS

| | | |
|---|---|---|
| 0 025 221 | 3/1981 | European Pat. Off. . |
| 0 366 055 | 5/1990 | European Pat. Off. . |
| WO 94/15350 | 7/1994 | WIPO . |
| WO 94/15352 | 7/1994 | WIPO . |

OTHER PUBLICATIONS

Patent Abstracts of Japan, vol. 007, No. 072, Mar. 25, 1983 & JP 58 001956, Jan. 7, 1983 (Tokyo Shibaura Denki KK).

"Feldemitter", Sep. 20, 1990, Neues Aus Der Technik, Nr. 3, page(s) 6 XP000121490 (English Translation).

F. Davanloo, et al., "Laser Plasma Diamond", J. Mater. Res., vol. 5, No. 11, Nov. 1990, pp. 2398–2404.

*Primary Examiner*—Ashok Patel
*Assistant Examiner*—Mack Haynes

[57] ABSTRACT

Display panels having at least one suspended fibrous cathode containing an electron field emitter are disclosed. The fibrous cathode is supported by a substrate (10) containing two sets of parallel rows of crests and valleys. The first set of parallel crests (11) and valleys (12) provide the valleys along which the fibrous cathode is aligned. The second set of parallel crests (13) and valleys (14) is perpendicular to the first set. The valleys (14) provide the means for suspending the fibrous cathode. The display panels can be produced in large sizes while still maintaining high quality and efficiency.

27 Claims, 2 Drawing Sheets

DISPLAY PANELS USING FIBROUS FIELD EMITTERS

CROSS-REFERENCE TO RELATED APPLICATIONS

This application claims the benefit of U.S. Provisional Application Ser. No. 60/002,278, filed Aug. 14, 1995 and PCT International Application PCT/US96/12822, filed Aug. 6, 1996, wherein the United States was a designated country.

FIELD OF THE INVENTION

The present invention generally relates to display panels. In particular, the invention relates to display panels having a suspended fibrous cathode containing an electron field emitter.

BACKGROUND OF THE INVENTION

Display screens are used in a wide variety of applications, such as home and commercial large screen televisions, laptop and desktop computers, and indoor and outdoor advertising and information presentations. So-called flat panel displays are only a few inches thick in contrast to deep cathode ray tube monitors found on most televisions and desktop computers. Flat panel displays are a necessity for laptop computers, but also provide advantages in size and weight for many other applications. Currently, laptop computer flat panel displays utilize liquid crystals which can be switched from a transparent state to an opaque state by the application of small electrical signals. It is difficult to reliably produce these displays in sizes larger than those suitable for laptop computers.

Plasma displays have been proposed as an alternative to liquid crystal displays. Plasma displays utilize tiny pixel cells of electrically-charged gases to produce an image and require relatively large electrical power to operate.

Display panels having a cathode using a field emission electron source, i.e., a field emission material or field emitter, and a phosphor capable of emitting light upon bombardment by electrons emitted by the field emitter have been proposed. Such display panels have the potential for providing the visual display advantages of conventional cathode ray tubes and the depth, weight and power consumption advantages of flat panel displays. U.S. Pat. Nos. 4,857,799 and 5,015,912 disclose matrix-addressed flat panel displays using micro-tip cathodes constructed of tungsten, molybdenum or silicon. WO 94-15352, WO 94-15350 and WO 94-28571 disclose flat panel displays wherein the cathodes have relatively flat emission surfaces.

It has now been discovered that a fibrous cathode provides advantages over a cathode having a relatively flat emission surface. The fibrous cathode is supported by a substrate and further improved performance is achieved when the portions of the fibrous cathode addressed, and from which electron emission occurs, are suspended and not in direct physical contact with the substrate. As a result, there is a need for alternative technology for producing high quality and efficient display panels for all these applications and for producing them in large sizes when required. Other objects and advantages of the present invention will become apparent to those skilled in the art upon reference to the attached drawings and to the detailed description of the invention which hereinafter follows.

SUMMARY OF THE INVENTION

The present invention provides a display panel comprising a fibrous cathode formed of at least one fiber comprised of a field emission material, an electrically-conductive film serving as an anode and spaced apart from the fibrous cathode, and a phosphor layer capable of emitting light upon bombardment by electrons emitted by the fiber field emission material and positioned adjacent to the anode, wherein the fibrous cathode is supported by a substrate and the portions of the fibrous cathode addressed, and from which electron emission occurs, are suspended and not in direct physical contact with the substrate.

One embodiment provides for:

a. a regularly undulating surface on the substrate with a first set of parallel rows of crests and valleys and a second set of parallel rows of crests and valleys wherein the rows of crests and valleys of the first set are not parallel to the rows of crests and valleys of the second set;

b. a fibrous cathode consisting essentially of at least one fiber comprised of a field emission material aligned along the length of each of the valleys of the first set of parallel rows of crests and valleys; and c. a suspension element disposed along the length of each of the valleys of the second set of parallel rows of crests and valleys and supporting the fibrous cathode.

Preferably, the parallel rows of crests and valleys of the first set are perpendicular to the parallel rows of crests and valleys of the second set. It is also preferable to have the substrate coated with an electrically-conductive material except in the valleys and on the sides of the valleys of the second set of parallel rows of crests and valleys. This electrically-conductive coating serves as a gate electrode. The suspension element can be comprised of a non-emitting fiber aligned along the length of each of the valleys of the second set of parallel rows of crests and valleys. A second non-emitting fiber can be aligned along the length of each of the valleys of said second set of parallel rows of crests and valleys on top of said fibrous cathode thereby anchoring said fibrous cathode in place.

Another embodiment provides for:

a. a regularly undulating surface on the substrate consisting of parallel rows of valleys and essentially flat crests; and b. a fibrous cathode consisting essentially of a regularly spaced parallel array of fibers comprised of an emission material, wherein the fibers are supported on the essentially flat crests of the substrate and suspended above the valleys of the substrate.

In this embodiment, it is preferable to have the substrate coated with an electrically-conductive material in the valleys and on the sides of the valleys of the set of parallel rows of valleys and essentially flat crests, i.e., to have the substrate coated with a continuous strip of electrically-conductive material along each row of valleys but not along the essentially flat crests. Each said strip of the electrically-conductive coating serves as a gate electrode. The undulating surface can be formed by etching a smooth substrate such that the essentially flat crests correspond to lightly etched regions of the substrate and the valleys correspond to more heavily etched regions of the substrate. (It will be understood that other means of removing or building up material to form valleys and crests are also applicable in the invention).

In both of the above-described embodiments, at least one additional gate electrode can be provided to better control the emission of the electrons. It is especially preferred that the fibrous cathode be comprised of at least one composite fiber of diamond, diamond-like carbon, or glassy carbon wherein the composite fiber consists essentially of diamond, diamond-like carbon or glassy carbon on a non-diamond core. It will be understood that the description of the composite fiber as having a diamond, diamond-like carbon or glassy carbon coating also includes a coating comprising combinations thereof.

These embodiments provide improved control of electron emission in a display panel.

DETAILED DESCRIPTION OF THE PREFERRED EMBODIMENTS

Figure 1A:
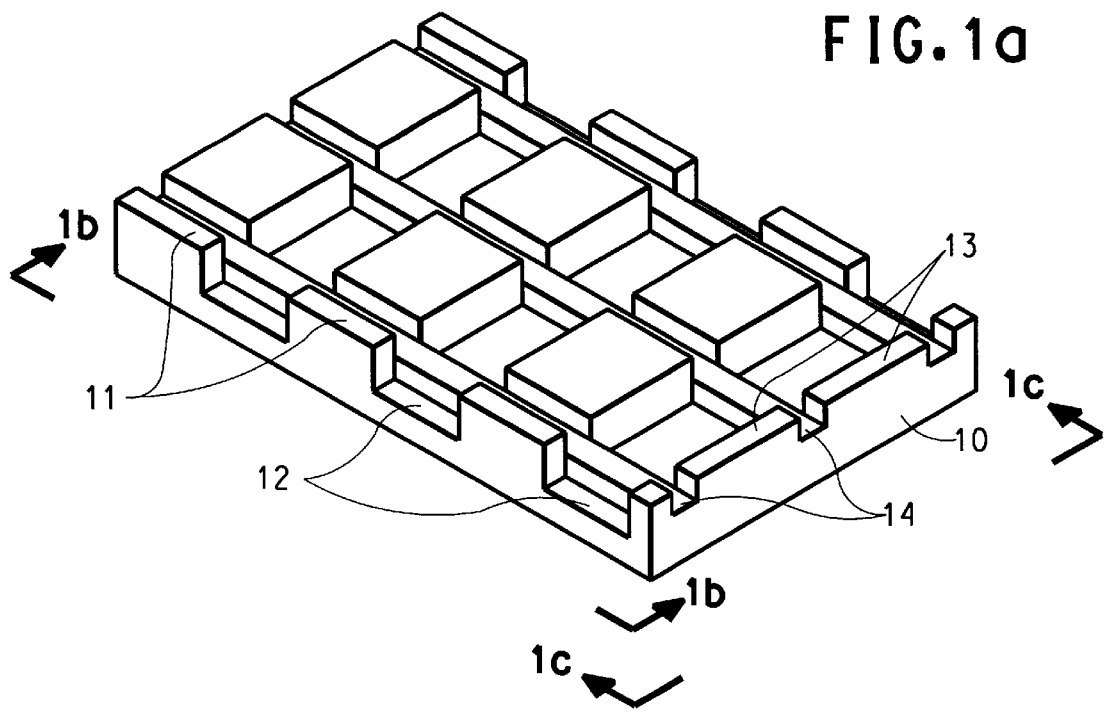
FIG. 1(a) illustrates an embodiment of the invention with a substrate containing one set of parallel rows of crests and valleys perpendicular to a second set of parallel rows of crests and valleys.

The present invention provides for a display panel comprised of a fibrous cathode in which the portions of the fibrous cathode addressed, and from which electron emission occurs, are suspended and not in direct physical contact with the substrate.

The display panel provided by this invention preferably comprises: (a) a fibrous cathode formed of a plurality of fibers comprised of a field emission material; (b) a patterned, optically transparent electrically-conductive film serving as an anode and spaced apart from the fibrous cathode; and (c) a phosphor layer, situated immediately adjacent to the anode and capable of emitting light upon bombardment by electrons emitted by the fibers of the fibrous cathode.

It will be understood that the arrangement and placement of the anode and the phosphor layer may vary without departing from the spirit of the invention. For example, the phosphor layer may be positioned between the anode and the cathode or, alternatively, the anode may be positioned between the phosphor layer and the cathode. The display panel can also contain one or more gate electrodes situated typically between the anode and the fibrous cathode. The gate electrode generally comprises a patterned structure of conductive paths arranged substantially orthogonally to the patterned film of the anode. Each conductive path is selectively operably connected to an electron source.

Flat panel displays are so-called because they are only a few inches thick. They are generally planar but can be curved or have other configurations as required by the specific application. Thus, as used herein, the terms "display panel" or "flat panel display" embrace planar and curved surfaces as well as other possible geometries.

The anode is an electrically-conductive film on a support plate. Typically, the support plate will be an optically transparent material such as glass and the electrically-conductive film will be indium-tin oxide. The conductive film is placed on the side of the anode support plate facing the cathode. The conductive film may be patterned, and in such an embodiment, the patterned conductive film preferably consists of rows of conductive material. The cathode and anode are typically planar structures although the surfaces may be configured to optimize performance of the field emitter. The plane of the anode is essentially parallel to the plane of the cathode. The cathode and anode are typically spaced apart from one another by a mechanical spacer. The phosphor layer is one which emits light of desired wavelength upon bombardment by electrons emitted by the fibrous cathode. Examples of such phosphors include ZnO, ZnS, doped ZnS and the like. Preferably, the phosphor layer is immediately adjacent the anode and, for convenience of manufacture, can be deposited directly onto the conducting film.

When used, the gate electrode is typically comprised of a patterned electrically-conductive material which is electrically-isolated from the fibrous cathode and the anode containing the phosphor layer. This is most readily accomplished by depositing the patterned electrically-conductive material on an electrically-insulating material located either between the cathode and the phosphor layer or behind the cathode so that the cathode is positioned between the gate electrode and the anode. A gate electrode can be formed on the substrate supporting the fibrous cathode when this substrate has a suitably fashioned surface (e.g., could be flat or undulating). Materials suitable for the gate electrode include any of the metallic conductors commonly used as film conductors such as copper, gold, aluminum, indium-tin oxide, tungsten, molybdenum, chrome and the like. The patterned material can be in the form of rows or strips.

A suitable vacuum should be provided in the region between the cathode and the phosphor layer or between the cathode and the anode, if the anode is between the cathode and the phosphor layer. All materials in contact with or exposed to vacuum used in forming the display panel must be compatible with such a vacuum.

The field emitter or field emission material used in the fibrous cathode of this invention is a field emission electron source. Various fiber or fiber-like geometries are possible in forming the fibrous cathode which is comprised of at least one such fiber. By "fiber" is meant that one dimension is substantially greater than the other two dimensions. "Fiber-like" means any structure resembling a fiber even though that structure may not be movable and may not be able to support its own weight. For example, certain "fiber-like" structures, typically less than 10 $\mu$m in diameter, could be created directly on the substrate. The fibers can have any shape fiber cross-section limited only by the means of manufacture (e.g., design of the die or spinneret). Additionally, variations in the shape of the spinneret may lead to desirable internal molecular microstructure within the fibers themselves. Fibers may be bundled together in the fashion of multiple filaments.

These fibers can be made of the field emitter alone or can be a composite fiber of a non-field emitter core with a thin layer or coating of field emitter surrounding the core. Preferably, the core material is conductive or semiconductive. In another embodiment, the fiber may consist of a more complex structure, for example, a non-conductive core surrounded by a thin coating of conductive or semi-conductive material with a field emission material surrounding the coating.

The present invention may employ, for example, diamond, diamond-like carbon or glassy carbon as field emission materials. The fibrous cathode can be comprised of diamond, diamond-like carbon or glassy carbon composite fibers consisting essentially of diamond, diamond-like carbon or glassy carbon on non-diamond core fibers. The core material can be, e.g., a conductive carbon such as graphite or a metal such as tungsten, copper, titanium or molydenum or can be a semiconductor, e.g., silicon or silicon carbide. In an alternate embodiment, the core can be a metallized insulator such as tungsten coated on a non-conductive polyester, nylon or Kevlar® fiber (Kevlar® is a registered trademark of E.I. du Pont de Nemours and Company, Wilmington, Del.). In other embodiments, a diamond, diamond-like carbon or glassy carbon precursor can be coated onto the non-diamond core and the diamond, diamond-like carbon or glassy carbon is then formed by appropriate treatment of the precursor.

Diamond fibers and fibrous diamond composites, such as diamond-coated graphite or diamond-coated carbon, preferably include a sub-micron scale crystal structure of diamond, i.e., diamond having crystal sizes of generally less than about 1 micron in at least one crystal dimension. Within the sub-micron sized diamond crystals, such diamond crystals include at least some exposed 111-oriented crystal facets, some exposed 100-oriented crystal facets, or some of both. Another form of diamond having suitable sub-micron dimensions is commonly referred to as cauliflower-diamond which has fine grained balls as opposed to a pyramidal structure.

Fibers including diamond-like carbon with an appropriate short range order, i.e., a suitable combination of $sp^2$ and $sp^3$ bonding may also provide for field emission materials with high current densities. By "short range order" is generally meant an ordered arrangement of atoms less than about 10 nanometers (nm) in any dimension. It may also be possible to use fibers, e.g., carbon fibers, coated with amorphic diamond via laser ablation as described by Davanloo et al. in J. Mater. Res., Vol. 5, No. 11, Nov. 1990.

Fibers containing glassy carbon, an amorphous material exhibiting Raman peaks at about 1380 $cm^{-1}$ and 1598 $cm^{-1}$, as the field emitter material are also useful. "Diamond-like carbon" is used herein to designate the material referred to in the literature as diamond-like carbon as well as glassy carbon and carbon containing microscopic inclusions of glassy carbon, all of which are diamond-like in their performance as fiber field emission materials Generally, the composite fibers have a total diameter ranging from about 1 micron to about 100 microns, preferably from about 3 microns to about 15 microns. The emission material layer or coating in such a composite fiber can generally be from about 50 Angstroms (5 $\mu$m) to about 50,000 Angstroms (5 $\mu$m), preferably from about 1000 Angstroms (0.1 $\mu$m) to about 20,000 Angstroms (2 $\mu$m), more preferably from about 1000 Angstroms (0.1 $\mu$m) to about 5,000 (0.5 $\mu$m) Angstroms.

Diamond typically has several low index facets of low or negative electron affinity, e.g., 100-faceted diamond with a low affinity whereas 111-faceted diamond has a negative electron affinity. Diamond-like carbon or glassy carbon may preferably be n-type doped with, e.g., nitrogen or phosphorus, to provide more electrons and reduce the work function of the material.

Such a diamond or diamond-like carbon layer preferably has rough jagged edges such that a series of spikes and valleys is present upon the diamond or diamond-like carbon layer. In diamond coatings, this surface morphology results from a microcrystalline structure of the diamond material. It may be preferred that a minor amount of graphite be situated between at least a portion of said diamond crystals within said diamond coating for best results. It may also be preferred that diamond grown via chemical vapor deposition (CVD) develop in columnar fashion due to slight misalignment between the growing crystals. This misalignment may also promote the development of the rough jagged edges of the diamond morphology.

One manner of providing diamond composite fibers is to coat a fiber-shaped substrate with diamond via a plasma CVD process with microwave excitation, radio frequency excitation or hot filament excitation of a feed gas mixture including a minor amount of a carbon-containing gas such as methane, ethylene, carbon monoxide and the like and a major amount of hydrogen. The diamond CVD coating process is slightly modified when graphite is the core of the diamond composite core, since graphite is known to be a difficult material to coat with diamond via CVD because of the etching away of the graphite substrate by atomic hydrogen in the plasma. Accordingly, graphite fibers are preferably pre-treated to increase the density of nucleation sites for diamond upon the graphite fibers surface. The graphite fibers can be agitated with diamond powder or grit, in a liquid medium, preferably an organic solvent medium such as methanol, thereby ablating the surface and embedding diamond powder particles in the graphite.

In FIG. 1(a) is shown the substrate 10 used in an embodiment of the invention in which the substrate contains two sets of parallel rows of crests and valleys. The first set of parallel crests 11 and valleys 12 (first set) provide the valleys along which the fibrous cathode (consisting essentially of at least one fiber comprised of a field emission material) is aligned. The second set of parallel crests 13 and valleys 14 (second set) is shown perpendicular to the first set, which is the preferred configuration. Both sets of crests and valleys are shown with vertical walls between the crests and valleys, but sloped or curved sections can also be used. The parallel rows of crests and valleys are shown regularly spaced, i.e., the distance between the centers of two neighboring crests or between the centers of two neighboring valleys is the same within each set. Alternatively, when several phosphors are used (e.g., three phosphors can be used to provide a color display) the dimensions in the first set can be varied to compensate for differences in efficiencies of the different phosphors. In that case, each triad, i.e., each set of three pair of crests and valleys, will be regularly spaced.

The valleys of the second set are typically narrower and less deep than the valleys of the first set as shown in FIG. 1(a). Generally, the valleys of the first set are from about 25 $\mu$m to about 250 $\mu$m deep, preferably from about 100 $\mu$m to about 150 $\mu$m deep, and from about 10 $\mu$m to about 350 $\mu$m wide, preferably from about 150 $\mu$m to about 250 $\mu$m wide, and the crests of the first set are from about 25 $\mu$m to about 250 $\mu$m wide, preferably from about 50 $\mu$m to about 150 $\mu$m wide. Generally, the valleys of the second set are from about 10 $\mu$m to about 150 $\mu$m deep, preferably from about 20 $\mu$m to about 50 $\mu$m deep, and from about 50 $\mu$m to about 125 $\mu$m wide and the crests of the second set are from about 600 $\mu$m to about 700 $\mu$m wide. The substrate can be made of insulators such as soda lime glass, pyrex, and glass ceramics.

Although the foregoing dimensions are typical of high density television implementation, those skilled in the art will understand that dimensions will vary for other types of display panels of lower or higher pixel size or for different shapes.

Typical ways of forming two such sets of parallel rows of crests and valleys on these substrate materials include etching, using ceramic GREEN TAPE™ (commercially available from E.I. du Pont de Nemous and Company, Wilmington, Del.), sandblasting, thick film sequential deposition, laser ablation and forging, although other means are possible and not excluded from this invention.

Figure 1B:
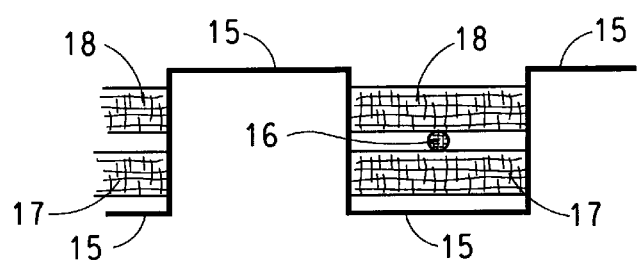
FIGS. 1(b) and 1(c) illustrate orthogonal views of FIG. 1(a) showing the parallel rows of crests and valleys containing a fibrous cathode between a suspension element and an anchoring element.
Figure 1C:
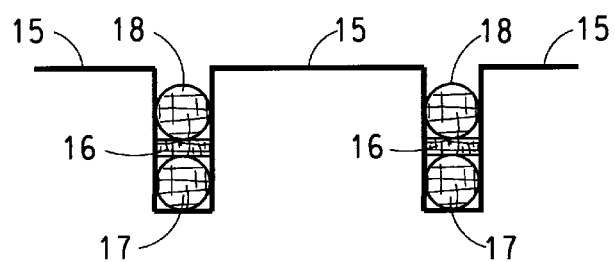

The valleys of the second set provide the means for suspending the fibrous cathode. The fibrous cathode can be placed along the length of each valley of the first set and be suspended by the surfaces of the valleys of the second set when these valleys are less deep than those of the first set. Preferably, a suspension element is disposed along the length of each of the valleys of the second set to support the fibrous cathode. The suspension element can be a continuous structure, e.g., a non-emitting fiber aligned along the length of each valley and upon which the emitting fibrous cathode rests. A film extended along the length of each valley could also be used. The embodiment using a non-emitting fiber aligned along the length of each valley as the suspension element is shown in FIGS. 1(b) and 1(c) which are two orthogonal views of the substrate of FIG. 1(a). Before the fibrous cathode is positioned on the substrate, it is preferable to have the substrate coated with an electrically-conductive material to provide means to apply a voltage and create the electric field necessary for emission. Such an electrically-conductive material 15 is shown in FIGS. 1(b) and 1(c). The electrically-conductive material coats the substrate, except in the valleys and on the sides of the valleys of the second set, thereby providing a substrate coated with a parallel array of continuous strips of electrically-conductive material. Each said strip of this parallel array serves as a gate electrode. The fibrous cathode 16 is shown resting on the non-emitting fiber 17 running through each valley of the second set. Also shown is a second non-emitting fiber 18 aligned along the length of each of the valleys of the second set on top of said fibrous cathode thereby anchoring said fibrous cathode in place. A non-emitting fiber aligned along the length of each of the valleys of the second set on top of said fibrous cathode thereby anchoring said fibrous cathode in place can also be used when suspension is achieved by means other than a non-emitting fiber.

Alternatively, the suspension element can be a discontinuous structure comprised of a series of pedestals or films on each valley of the second set at each intersection with a valley of the first set. The use of a suspension element is required when the valleys of the second set are as deep or deeper than the valleys of the first set.

One or more additional gate electrodes can be further provided to better control the emission of electrons.

In another embodiment of the invention, the display panel has a regularly undulating surface on the substrate consisting of parallel rows of valleys and essentially flat crests. In this embodiment, the fibrous cathode consists essentially of a regularly spaced parallel array of fibers, wherein the fibers are supported on the essentially flat crests of the substrate and suspended above the valleys of the substrate. For example, the undulating surface can formed by etching a smooth substrate such that the essentially flat crests correspond to lightly etched regions of the substrate and the valleys correspond to more heavily etched regions of the substrate. Substrates with this type of structure can also be formed by the methods provided for the first embodiment above, including laser ablation. Preferably, the fibers of the fibrous cathode are essentially perpendicular to the parallel rows of valleys and essentially flat crests. It is also preferable to have the substrate coated with a continuous strip of an electrically-conductive material in the valleys and on the sides of the valleys of the set of parallel rows of valleys and essentially flat crests (i.e., to have the substrate coated with a continuous strip of electrically-conductive material along each row of valleys but not along the essentially flat crests). This thereby provides a substrate coated with a parallel array of continuous strips of electrically-conductive material, one such strip along each row of valleys. This parallel array provides a multiplicity of gate electrodes (i.e., each said strip serves as a gate electrode) which run transverse to the valleys through which the fibers of the fibrous cathode run.

Figure 2A:
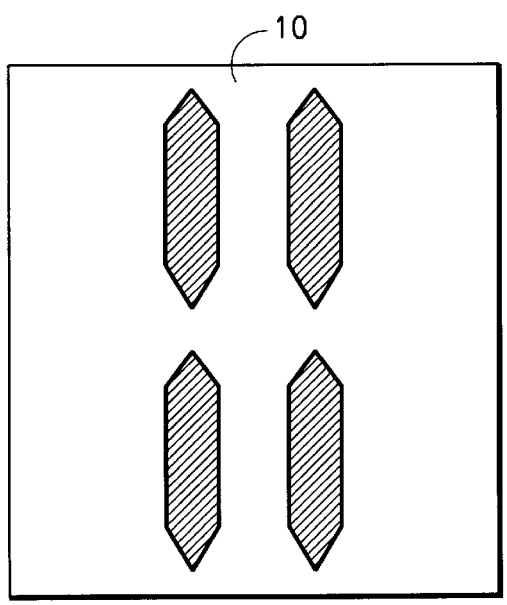
FIG. 2, containing views 2(a), 2(b) and 2(c), illustrates another possible embodiment of the invention wherein the substrate consists of parallel rows of valleys and essentially flat crests made from a starting diamond-shaped pattern.
Figure 2B:
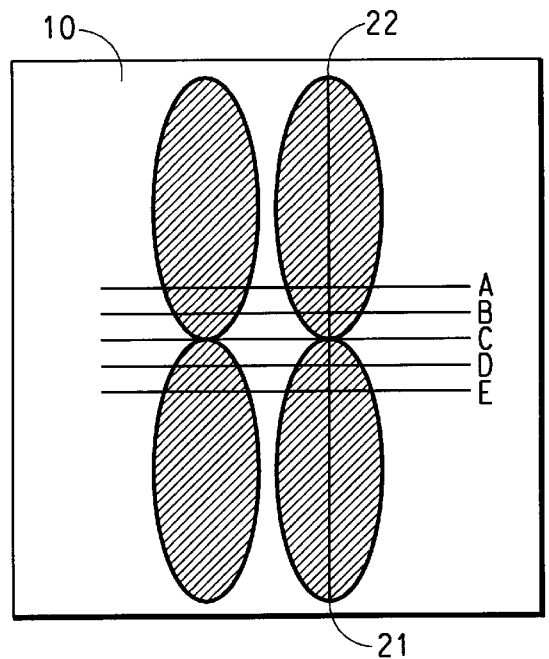
Figure 2C:
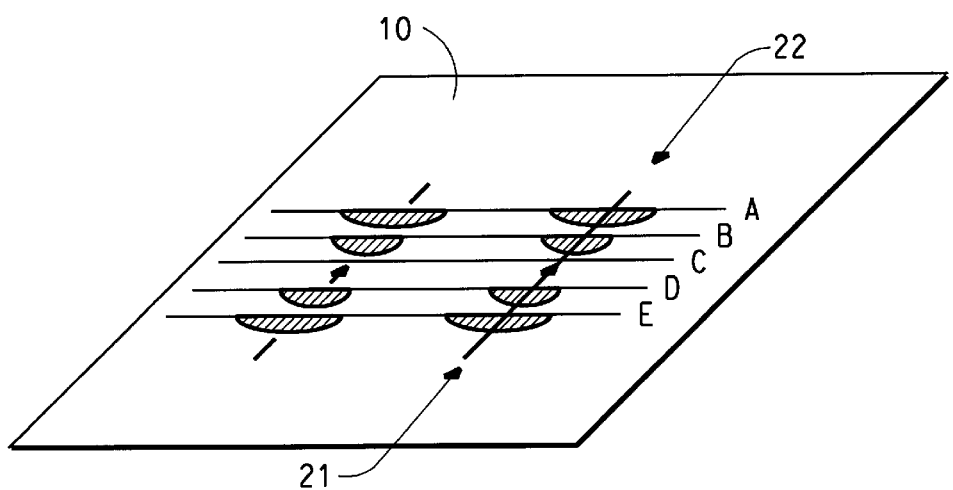

A variation of this embodiment, which can provide better control of the electron emission, is one in which the valleys and the essentially flat crests occur in rows but these rows are not continuous, i.e., there is a region of the substrate along which the surface is undulating with a succession of valleys and essentially flat crests and on either side of this region are regions with essentially flat surfaces and on the other sides of both of these flat regions are other regions along which the surface is undulating with a succession of valleys and essentially flat crests. Thus, according to this varied embodiment, there are still parallel rows of valleys and essentially flat crests; however, they are not continuous rows, but, rather (1) rows of valleys wherein the valleys are placed at regular intervals along each row; and(2) rows of essentially flat crests with the essentially flat crests placed at regular intervals along each row. Such an embodiment is shown in FIG. 2. FIGS. 2(a)–2(c). FIG. 2(a) shows a possible etch pattern on the surface of the substrate 10. This pattern could be used to form the valleys and essentially flat crests. FIG. 2(b) shows the areas of the substrate 10 that would be etched, as represented by the ellipses, to form the valleys. Lines A, B, C, D and E represent the intersection of cross-sectional planes with the surface of the substrate. The line 21–22 represents the fibrous cathode. FIG. 2(c) shows the depth profile of the etched valleys along the 21–22 line of FIG. 2(b). The rectangular plane represents the surface of the substrate 10. The intersection of the substrate with the cross-sectional plane represented by line C occurs at a crest between valleys. The increasing depth and width of the valleys on either side of the crest are first shown on the cross-sectional planes which intersect the substrate at B and D. Still wider and deeper profiles of the valley are shown on the cross-sectional planes which intersect the substrate at A and E. As one progresses toward the center of the etched valleys, the valleys become wider and deeper. The fibers of the fibrous cathode would be aligned along lines such as the 21–22 line of FIGS. 2(b) and 2(c).

It should be noted that in the embodiments of the invention, the axis of each fiber of which the fibrous cathode is comprised lies essentially in the plane of the cathode. Thus, electron emission from these fibers occurs along the length of the fibers utilized and not from the fiber tip or end.

As noted above, the substrate can be made of insulators such as soda lime glass, pyrex (borosilicate glass) and glass ceramics. The valleys and essentially flat crests can be formed by well-known etching techniques. In one example, glass substrates were cleaned with a detergent (Sparkleen® commercially available from Fisher Scientific) and rinsed well with deionized water. The water was removed in an isopropyl alcohol vapor drier. The side of the glass to be etched and patterned was coated with a 50 nm layer of chromium followed by a 200 nm layer of gold using an electron beam coater. Positive photoresist (EPA 914E2-30 commercially available from Hoechst Celanese) was spun onto the gold surface and baked at 100° C. for 30 minutes. Exposure of the photoresist was carried out using a Colight vacuum contact printer and the image was developed with Ultramac MF 96 developer. The exposed gold image was etched in $I_2$/KI solution and the chromium exposed by this etching was subsequently etched in KTI Chrome Etch. The exposed glass was etched in HF solution to obtain appropriate etch depths in the glass.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A display panel comprised of a fibrous cathode formed of at least one fiber comprised of a field emission material, an electrically-conductive film serving as an anode and spaced apart from the fibrous cathode, and a phosphor layer capable of emitting light upon bombardment by electrons emitted by the fiber field emission material and positioned adjacent to the anode, wherein the fibrous cathode is supported by a substrate and the portions of said fibrous cathode addressed, and from which electron emission occurs, are suspended and not in direct physical contact with the substrate, wherein the display panel further comprises:
   a. a regularly undulating surface on said substrate with a first set of parallel rows of crests and valleys and a second set of parallel rows of crests and valleys wherein the rows of crests and valleys of said first set are not parallel to the rows of crests and valleys of said second set;
   b. said fibrous cathode consisting essentially of at least one fiber comprised of a field emission material aligned along the length of each of the valleys of said first set of parallel rows of crests and valleys; and
   c. means for suspending the fibrous cathode.

2. The display panel of claim 1 wherein the means for suspending the fibrous cathode is the surfaces of the valleys of the second set of parallel rows of crests and valleys and wherein the valleys of the second set are not as deep as the valleys of the first set.

3. The display panel of claim 1 wherein the means for suspending the fibrous cathode is a suspension element disposed along the length of each of the valleys of said second set of parallel rows of crests and valleys and supporting said fibrous cathode.

4. The display panel as in any one of claims 1–3 wherein said substrate is coated with an electrically-conductive material, except in the valleys and on the sides of the valleys of said second set of parallel rows of crests and valleys, thereby providing a substrate coated with a parallel array of continuous strips of electrically-conductive material, each said strip serving as a gate electrode.

5. The display panel of claim 4 wherein said fibrous cathode is comprised of at least one diamond, diamond-like carbon or glassy carbon composite fiber consisting essentially of diamond, diamond-like carbon or glassy carbon on a non-diamond core.

6. The display panel of claim 4 further comprising at least one additional gate electrode.

7. The display panel of claim 4 in which the parallel rows of crests and valleys of said first set are perpendicular to the parallel rows of crests and valleys of said second set.

8. The display panel of claim 3 wherein said suspension element is comprised of a non-emitting fiber aligned along the length of each of the valleys of said second set of parallel rows of crests and valleys.

9. The display panel of claim 8 wherein a second non-emitting fiber is aligned along the length of each of the valleys of said second set of parallel rows of crests and valleys on top of said fibrous cathode thereby anchoring said fibrous cathode in place.

10. The display panel as in any one of claims 8–9 further comprising at least one additional gate electrode.

11. The display panel as in any one of claims 8–9 in which the parallel rows of crests and valleys of said first set are perpendicular to the parallel rows of crests and valleys of said second set.

12. The display panel of claim 11 further comprising at least one additional gate electrode.

13. The display panel of claim 11 in which the valleys of said first set are from about 25 $\mu$m to about 250 $\mu$m deep and from about 10 $\mu$m to about 350 $\mu$m wide, the crests of said first set are from about 25 $\mu$m to about 250 $\mu$m wide, the valleys of said second set are from about 10 $\mu$m to about 150 $\mu$m deep and from about 50 $\mu$m to about 125 $\mu$m wide, and the crests of said second set are from about 600 $\mu$m to about 700 $\mu$m wide.

14. The display panel of claim 13 in which the valleys of said first set are from about 100 $\mu$m to about 150 $\mu$m deep and from about 150 $\mu$m to about 250 $\mu$m wide, the crests of said first set are from about 50 $\mu$m to about 150 $\mu$m wide, and the valleys of said second set are from about 20 $\mu$m to about 50 $\mu$m deep.

15. The display panel as in any one of claims 1–3 further comprising at least one gate electrode and wherein the parallel rows of crests and valleys of said first set are perpendicular to the parallel rows of crests and valleys of said second set.

16. The display panel of claim 15 wherein said fibrous cathode is comprised of at least one diamond, diamond-like-carbon or glassy carbon composite fiber consisting essentially of diamond, diamond-like-carbon or glassy carbon on a non-diamond core.

17. The display panel of claim 15 in which the valleys of said first set are from about 25 $\mu$m to about 250 $\mu$m deep and from about 10 $\mu$m to about 350 $\mu$m wide, the crests of said first set are from about 25 $\mu$m to about 250 $\mu$m wide, the valleys of said second set are from about 10 $\mu$m to about 150 $\mu$m deep and from about 50 $\mu$m to about 125 $\mu$m wide, and the crests of said second set are from about 600 $\mu$m to about 700 $\mu$m wide.

18. The display panel of claim 17 in which the valleys of said first set are from about 100 $\mu$m to about 150 $\mu$m deep and from about 150 $\mu$m to about 250 $\mu$m wide, the crests of said first set are from about 50 $\mu$m to about 150 $\mu$m wide, and the valleys of said second set are from about 20 $\mu$m to about 50 $\mu$m deep.

19. The display panel as in any one of claims 1–3 and 17–18 wherein said fibrous cathode is comprised of at least one diamond, diamond-like carbon or glassy carbon composite fiber consisting essentially of diamond, diamond-like carbon or glassy carbon on a non-diamond core.

20. A display panel comprised of a fibrous cathode formed of at least one fiber comprised of a field emission material, an electrically-conductive film serving as an anode and spaced apart from the fibrous cathode and a phosphor layer capable of emitting light upon bombardment by electrons emitted by the fiber field emission material and positioned adjacent to the anode, wherein the fibrous cathode is supported by a substrate and the portions of said fibrous cathode addressed, and from which electron emission occurs, are suspended and not in direct physical contact with the substrate, wherein the display panel further comprises:
   a. a regularly undulating surface on said substrate consisting of parallel rows of valleys and essentially flat crests; and
   b. said fibrous cathode consisting essentially of a regularly spaced parallel array of fibers, wherein said fibers are supported on said essentially flat crests of said substrate and suspended above said valleys of said substrate.

21. The display panel of claim 20 wherein said substrate is coated with an electrically-conductive material in the valleys and on the sides of the valleys of said set of parallel rows of valleys and essentially flat crests thereby providing a substrate coated with a parallel array of continuous strips of electrically-conductive material, one strip along each row of valleys, each said strip serving as a gate electrode.

22. The display panel of claim 21 wherein said fibrous cathode is comprised of at least one diamond, diamond-like carbon or glassy carbon composite fiber consisting essentially of diamond, diamond-like carbon or glassy carbon on a non-diamond core.

23. The display panel of claim 22 in which said undulating surface is formed by etching a smooth substrate, wherein said essentially flat crests correspond to lightly etched regions of said substrate and said valleys correspond to more heavily etched regions of said substrate.

24. The display panel of claim 20 wherein said fibrous cathode is comprised of at least one diamond, diamond-like carbon or glassy carbon composite fiber consisting essentially of diamond, diamond-like carbon or glassy carbon on a non-diamond core.

25. The display panel as in any one of claims 20–24 wherein said fibers of said fibrous cathode are essentially perpendicular to said parallel rows of valleys and essentially flat crests.

26. The display panel as in any one of claims 20–24 further comprising additional gate electrode.

27. The display panel as in claim 24 wherein said fibers of said fibrous cathode are essentially perpendicular to said parallel rows of valleys and essentially flat crests.

* * * * *